No. 693,666. Patented Feb. 18, 1902.
W. N. PARKES.
AUTOMATIC EMBROIDERY OR ORNAMENTAL STITCH MACHINE.
(Application filed May 18, 1899.)
(No Model.) 5 Sheets—Sheet 1.

Witnesses.
J. B. McGirr.
Chester H. Higgins

Inventor.
William N. Parkes
By William R. Baird
His Attorney.

No. 693,666. Patented Feb. 18, 1902.
W. N. PARKES.
AUTOMATIC EMBROIDERY OR ORNAMENTAL STITCH MACHINE.
(Application filed May 18, 1899.)
(No Model.) 5 Sheets—Sheet 3.

Witnesses. Inventor.

No. 693,666. Patented Feb. 18, 1902.
W. N. PARKES.
AUTOMATIC EMBROIDERY OR ORNAMENTAL STITCH MACHINE.
(Application filed May 18, 1899.)
(No Model.) 5 Sheets—Sheet 4.

Witnesses.

Inventor.
William N. Parkes
By William R. Baird
His Attorney.

No. 693,666. Patented Feb. 18, 1902.
W. N. PARKES.
AUTOMATIC EMBROIDERY OR ORNAMENTAL STITCH MACHINE.
(Application filed May 18, 1899.)
(No Model.) 5 Sheets—Sheet 5.

Witnesses:
J. B. McGirr
Chester H. Higgins

Inventor
William N. Parkes
By William R. Baird
His Attorney

UNITED STATES PATENT OFFICE.

WILLIAM N. PARKES, OF BROOKLYN, NEW YORK.

AUTOMATIC EMBROIDERY OR ORNAMENTAL-STITCH MACHINE.

SPECIFICATION forming part of Letters Patent No. 693,666, dated February 18, 1902.

Application filed May 18, 1899. Serial No. 717,292. (No model.)

*To all whom it may concern:*

Be it known that I, WILLIAM N. PARKES, a citizen of the United States of America, residing at New York, borough of Brooklyn, county of Kings, and State of New York, have invented certain new and useful Improvements in Automatic Embroidery or Ornamental-Stitch Sewing-Machines, of which the following is a specification.

My invention has special reference to embroidery, ornamental-stitch, or quilting sewing-machines.

The main object of my present invention is to improve and enlarge the scope of my former machine patented June 26, 1900, No. 652,326.

In the drawings, Fig. 4 is a front view of the actuating-ratchet for the work-carrier mechanism, showing the cross-head and adjustable crank-pin connection for the same. Fig. 5 is a rear view of the same ratchet, showing the friction device and the arrangement of the actuating-pawls with one of them held out of engagement with the wheel. Fig. 6 illustrates the two pawls in engagement with the wheel. Fig. 7 is a vertical section on line $a\,a$, Fig. 3. Fig. 10 is a detail showing the adjustment of the cam for reciprocating the work-carrier. Fig. 16 is a section on line $x\,x$, Fig. 3. Fig. 16$^a$ is a detail showing the notch $b^5$ in the hoop $b^3$.

In the drawings similar letters of reference designate corresponding parts.

Referring to the drawings, the letter A designates the bed-plate, A' the overhanging arm, $A^2$ the needle-bar gate, $A^3$ the upper shaft, and $A^4$ the lower shaft, of the machine. The needle-bar movement is the same as shown and claimed by me in United States Patent granted to me October 26, 1897, No. 592,510; but, as will be seen, the mechanism for producing it is different. The needle-thread-loop-engaging mechanism I use is a well-known type that is used in overseaming-machines.

The mechanism for holding and moving the work preferably consists of the following: In suitable guideways on the bed A of the machine is mounted and adapted to reciprocate a frame B. On the frame B is mounted and adapted to rotate an annular work-carrier rack $b$, on the periphery of which is formed a toothed flange $b'$, which is adapted to be engaged by a gear-wheel. Around the inside of the rack $b$ and at the bottom of same is formed a flange $b^2$, on which rest work-holding hoops $b^3$. A spring $b^4$ normally presses down in a notch $b^5$, formed in the work-holding hoops $b^3$. A screw $b^6$ has a seat in the frame B, through which it is adapted to pass and come into contact with the bed A of the machine. This screw $b^6$ serves to hold the frame B in a fixed position when movement of it is not desired.

I will now describe the preferred means provided for rotating the work-carrier and for giving it its primary reciprocating movement.

As will be seen later on in this specification, other means are provided for reciprocating the work-carrier simultaneously with the means about to be described or separately from the said means.

Figures 8, 9, 11, 12, 13, 14, 15:
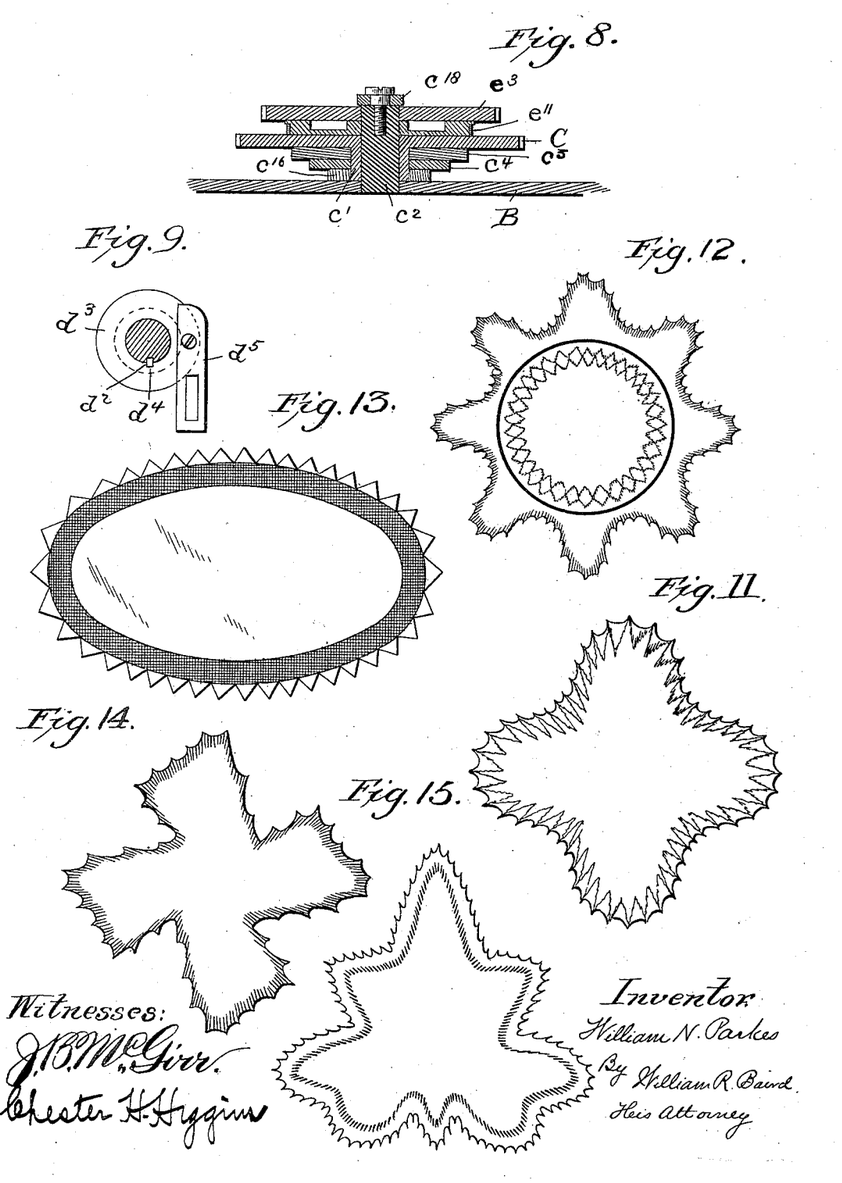
Fig. 8 is a vertical section on line $z\,z$, Fig. 3.
Fig. 9 is a view of the traveler $d^3$ looking from left to right.
Fig. 11 illustrates an outline stitched on the machine.
Figs. 12, 13, 14, and 15 also illustrate outlines stitched on the machine.

A ratchet-wheel C, Fig. 8, having a downwardly-projecting sleeve $c'$, is mounted on a hub $c^2$, which has a seat in the frame B. On the under side of the ratchet-wheel C is adjustably attached a cam $c^3$, which is adapted to engage a toothed rack $c^4$ between the jaws $c^5$, which are attached transversely thereto and extending upwardly therefrom, the rack $c^4$ being constructed to slide in a suitable guideway formed in the bed A of the machine. Keyed on the lower end of the sleeve $c'$ is a gear-wheel $c^{16}$, which meshes with a gear-wheel $c^7$, mounted on a bracket $c^8$. The bracket $c^8$ is adjustably attached to the frame B. The gear-wheel $c^7$ meshes with the toothed annular rack $b'$. A pawl-lever $c^{18}$ is mounted on the upper end of the hub $c^2$. A pawl $c^9$ is mounted on the pawl-lever $c^{18}$ and adapted to engage the ratchet-wheel C. A bolt $c^{10}$, passing through a shoe $c^{11}$, and a slot $c^{12}$, formed in the rack $c^4$, serve to rigidly fasten the rack when it is desired to do so to the bed A of the machine, or when it is not desired to fasten the rack $c^4$ to the bed of the machine to retain it in its guideway formed in the bed of the machine.

A shaft D is mounted and adapted to oscillate in standards $d'$, fastened in the bed of the machine. A feather $d^2$ is formed longitudinally on the shaft D. A traveler $d^3$ is mounted on said shaft and adapted to slide longitudinally of the same, a way $d^4$, adapted to fit the feather $d^2$, being formed in the traveler. An arm $d^5$ extends downwardly from the traveler $d^3$. A link $d^6$ is operatively connected at one of its ends to the arm $d^5$ and at its other end to the pawl-lever $c^{13}$. A bracket $d$ is attached to and carried by the frame B. A stud $d^7$ has a seat in and is carried by the bracket $d$, the upper end of the stud being adapted and formed to fit in a groove $d^8$ in the traveler $d^3$ and serving to move the traveler longitudinal of the shaft D when the frame B is reciprocated. An arm $d^9$ is mounted on the rear end of the shaft D. To the upper end of the arm $d^9$ is attached a link $d^{10}$, which at its other end is adjustably attached to an upright vibrating lever $d^{11}$. The lever $d^{11}$ is vibrated in a usual manner from a cam (not shown) which is mounted on the under shaft of the machine.

Figure 1:
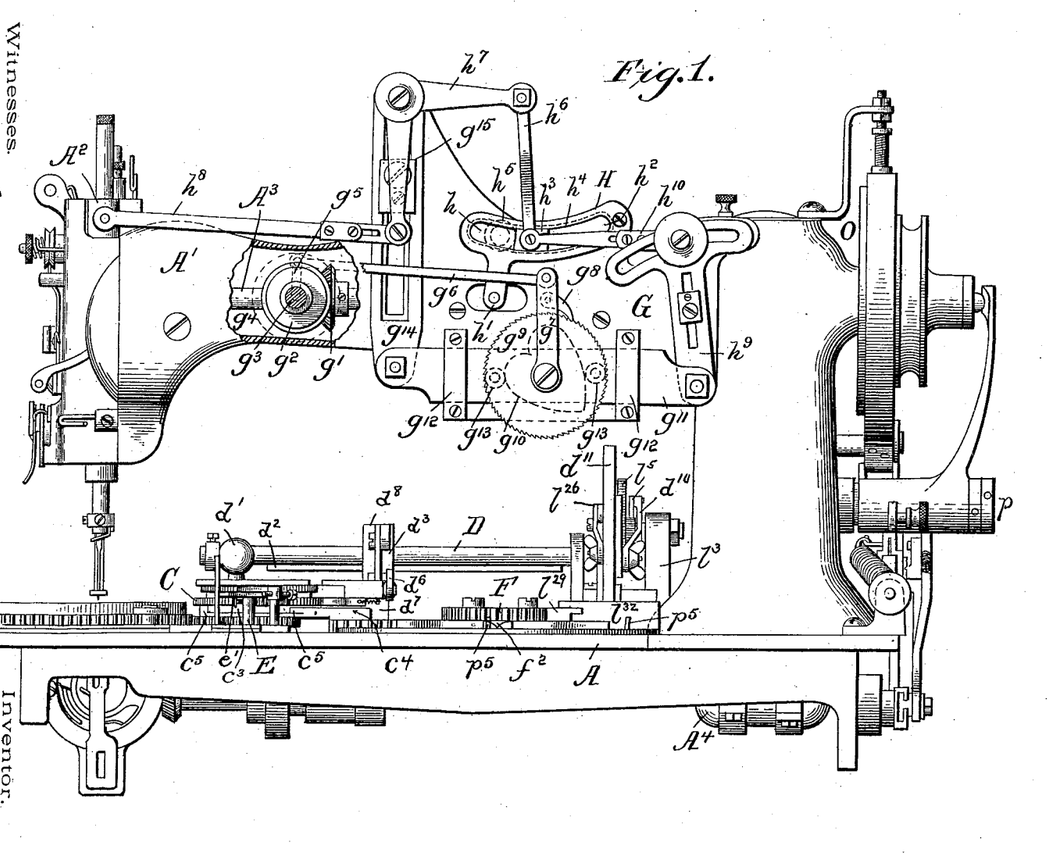
Figure 1 is a front elevation of the machine.
Figure 2:
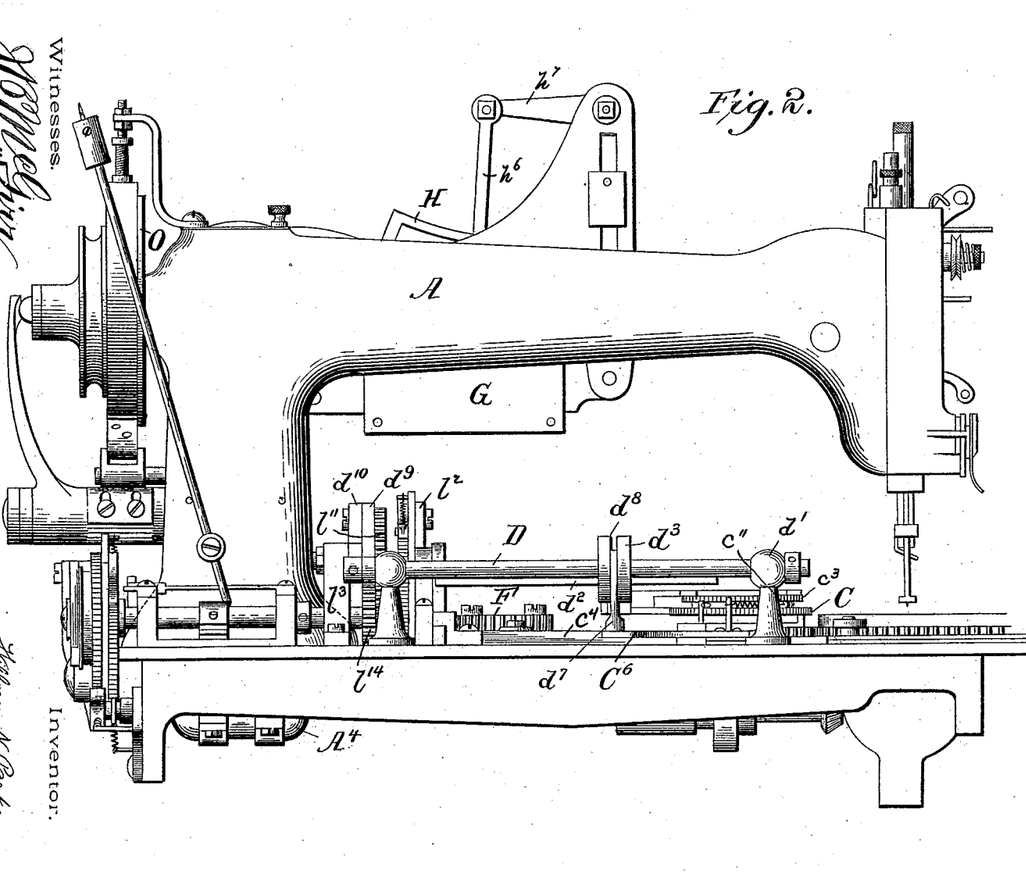
Fig. 2 is a rear elevation of the same.
Figure 3:
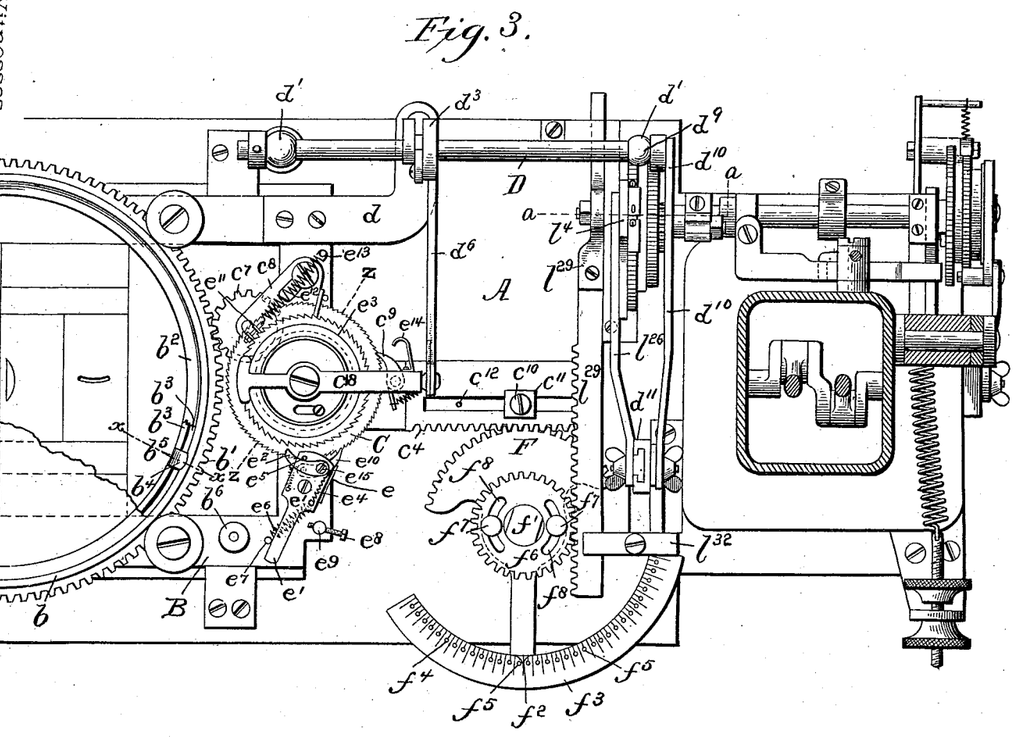
Fig. 3 is a top plan view of the work-carrier-actuating mechanism.

The following serves as a means for turning the ratchet-wheel C around manually and through it setting the work-carrier ahead or backward a measured distance or changing a predetermined number of teeth the angular position of the said ratchet-wheel C and the mechanism operated by it with respect to the angular position of the ratchet-wheel $b^5$ and the mechanism operated by it. On a stud E is mounted a hand-lever $e'$, on the upper side of which is mounted a pawl $e^2$, which is adapted to engage a ratchet-wheel $e^3$. The ratchet-wheel $e^3$ is attached to the upper side of the ratchet-wheel C, its teeth slanting in the opposite direction to those on the ratchet-wheel C, as shown in Fig. 3. A spring $e^4$ normally tends to hold the pawl $e^2$ in engagement with the ratchet-wheel C, and pin $e^5$ serves as a means for holding the said pawl out of engagement with the teeth of the said ratchet-wheel C. The pin $e^5$ fits in an ordinary pin-hole, from which it is readily removed to allow the pawl $e^2$ to engage the ratchet-wheel $e^3$ when it is desired to reverse the said wheel. A spring $e^6$ serves to normally hold the outer end of the lever $e'$ against the stop-pin $e^7$, and a screw $e^8$, passing horizontally through a stud $e^9$, serves as a means for adjusting the stroke of the lever $e'$, and through it the pawl $e^2$. A stop-pawl $e^{10}$, mounted on the under side of the lever $e'$, is adapted to prevent retrograde movement of the ratchet-wheel C. An ordinary catch-spring $e$, having a downwardly-extending portion (not shown) is provided for holding the pawl out of engagement with the ratchet-wheel C when it is desired to reverse the same. An adjustable friction-strap $e^{11}$ encircles a flange formed on the under side of the ratchet-wheel $e^3$. A spring $e^{12}$, attached at one end to a projecting part of the friction-strap and at the other end to a pin $e^{13}$, normally draws on the ratchet-wheel C in the opposite direction to the rotation of the same and prevents any undesirable forward movement. A catch-spring $e^{14}$ is adapted to hold the pawl $c^9$ out of engagement with the ratchet-wheel C when it is desired to reverse the same. A segmental toothed lever F is mounted on a stud $f'$; the toothed portion of which is adapted to engage the teeth on the rack $c^4$. An outer end $f^2$ of the lever F is formed and adapted to indicate the working position of the work-carrier $b'$ by means of a gage $f^3$. Pin-holes $f^4$ in the gage $f^3$ and pins $f^5$ serve as means for the operator to prelocate the working position of the work-carrier $b'$.

Figures 4, 5, 6, 7, 10, 16, 16A:
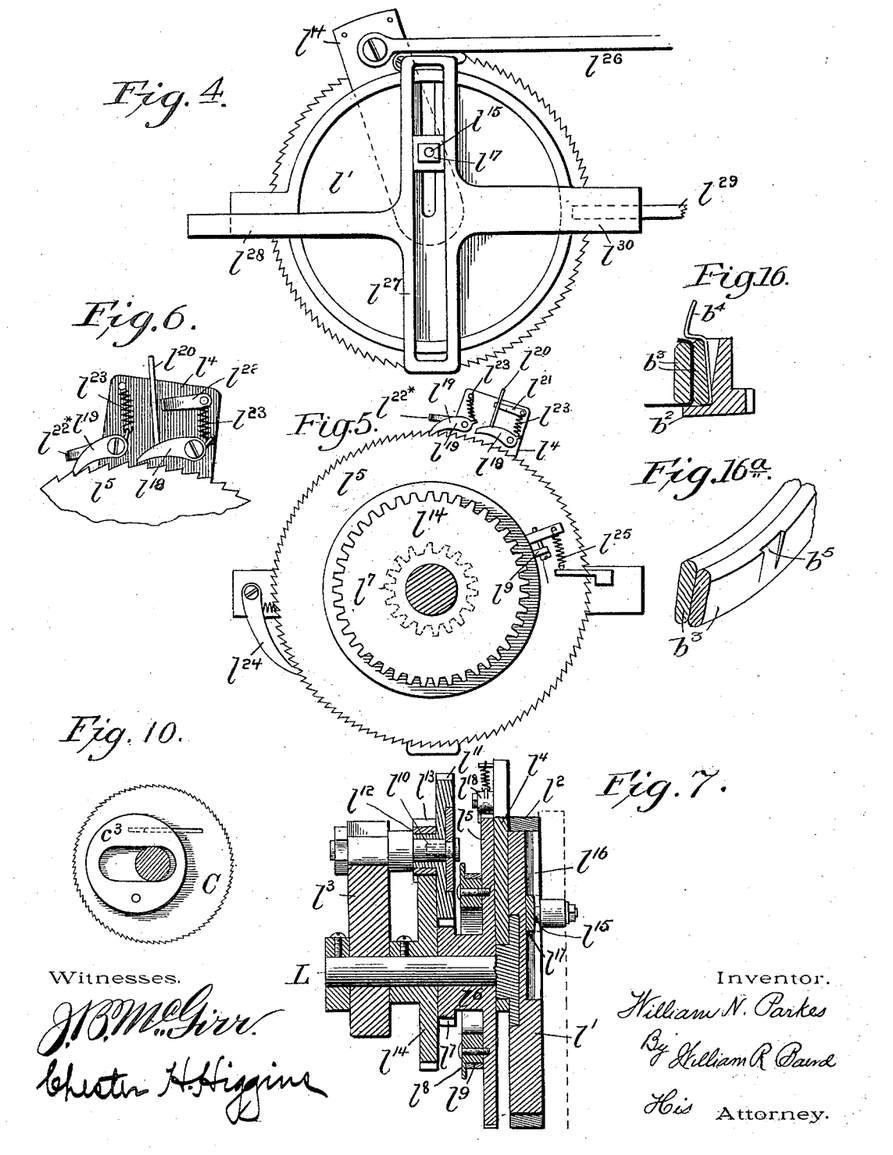

I have now described mechanism adapted to rotate the ratchet-wheel C, which in turn rotates the gears $c^6$ and $c^7$, and they in turn rotate the work-carrier $b'$. It is noticed that the rotation of the ratchet-wheel C also rotates the cam $c^3$, which is attached to the under side of the same. Assuming that the rack $e^4$ is rigidly held to the bed of the machine, it is further seen that the rotation of the cam $c^3$ through its engagement between the jaws $c^5$ reciprocates the frame B, and through it the work-carrier $b'$. The extent of the actuating movement of the cam $c^3$ will of course determine the extent of the reciprocations of the work-carrier, and the extent of this movement is under adjustment, as shown in Fig. 10. It is seen that the number of reciprocations of the work carrier with respect to the number of rotations of the same depends on the size of the gear-wheel $c^{16}$. It is also seen that the extent of the stroke of the actuating-pawl $c^9$ determines the number of stitches that will be made during the complete rotation of the work-carrier $b'$.

To partly explain the workings of the work-carrier up to this point, we will assume that the adjustments for the proper length of stitch has been made and that we desire to simply stitch a circle. To accomplish this, the screw $c^{10}$ is loosened and the screw $b^6$ is tightened sufficiently to prevent any movement of the frame B. Under these circumstances, assuming that the segmental toothed lever F is out of actuating engagement with the rack $c^4$, if the machine is actuated the rack $c^4$ will reciprocate, and the work-carrier will simply rotate, and thus stitch in a circle. If it is desired to stitch a number of concentric circles, the screw $b^6$ is loosened and the position of the work-carrier adjusted laterally for each circle. If it is desired to stitch a circle of scallops, the screw $b^6$ is loosened and the screw $c^{10}$ tightened, which prevents movement of the rack $c^4$. The frame B, being now free to move, is when the cam C is rotated reciprocated, and through it the work-carrier is reciprocated, and as it is rotated at the same time of course the outline stitched will be a circle of scallops. The number of scallops in a circle depends on the number of times the cam $c^3$ revolves with respect to the rotation of the work-carrier $b'$. An unlimited number of designs can be stitched through the mechanism thus far described by changing the size of the gear $c^{16}$ or the shape of the cam $c^3$. For example, if the cam $c^3$ is constructed and actuated so as to reciprocate the work-carrier four times during a complete rotation of the carrier it is evident that figures having square outlines will be stitched and that the shape of the cam and the extent of the action of the same will determine the detail outlines of the figure.

Before passing to a description of the balance of the mechanism provided for the movement of the work I will describe the mechanism provided for moving the needle-bar laterally or producing a relative jogging movement between the needle and the work-carrier. In United States Patent No. 592,510, granted to me October 26, 1897, before mentioned, I show and describe a number of then new needle-bar movements. In my present invention, which is the subject of this application, I use the same needle-bar movement described in the above-referred-to patent, but use improved mechanism for producing it.

On the front side of the arm $A'$ of the machine I attach a plate G, on which my mechanism controlling the lateral movements of the needle-bar is mounted. On the shaft $A^3$ of the machine is mounted a beveled gear $g'$, and mounted in a suitable bearing on the arm $A'$ of the machine is a beveled gear $g^2$, which meshes with beveled gear $g'$. A shaft $g^3$ is formed on the beveled gear $g^2$, which extends outwardly through the bearing for the same. On the outer end of the shaft $g^3$ is attached a disk $g^4$, in which is formed a slot $g^5$. A link $g^6$ is at one end adjustably connected in the slot $g^5$ and at the other end connected to a pawl-lever $g^7$, on which is mounted a pawl $g^8$. The pawl $g^8$ is adapted to engage a ratchet-wheel $g^9$, on the back of which is attached a cam $g^{10}$, (shown in dotted outline,) which engages a slide $g^{11}$, mounted in guideways $g^{12}$, through friction-rollers $g^{13}$, which are suitably mounted thereon. To the forward end of the slide $g^{11}$ is operatively connected the lower end of a lever $g^{14}$, which is mounted on an adjustable fulcrum $g^{15}$. A bell-crank lever H is mounted on the plate G at $h$, the lower member $h'$ of which is engagement with a usual switch-cam, (such as is used in overseaming-machines,) which is mounted on the upper shaft of the machine. In the horizontal member of the bell-crank lever H is a groove $h^2$, in which a shoe $h^3$ is adapted to slide, a plate $h^4$, in which there is a slot $h^5$, serving to retain the shoe in the groove $h^2$. A link $h^6$ is attached at its lower end to the shoe $h^3$ and at its upper end to the horizontal member of a bell-crank lever $h^7$, which is adapted to be fulcrumed on the upper end of the lever $g^{14}$ or the plate G. A link $h^8$ is at one end attached to the vertical member of the bell-crank lever $h^7$ and at its other end to the needle-bar frame $A^2$. To the rear end of the slide $g^{11}$ is attached a lever $h^9$, which is adjustably fulcrumed on the plate G. A link $h^{10}$ is at one end adapted to be connected to the plate G or the lever $h^9$. It will now be seen that if the lever $h^7$ is fulcrumed on the plate G an ordinary vibrating movement can be given to the needle-bar and that the extent of this movement can be regulated through the adjustable connection of the link $h^{10}$ to the plate G. It is also seen that by connecting the link $h^{10}$ with the lever $h^9$ the extent of the vibratory action of the needle can be automatically increased or decreased through the action of the ratchet-wheel $g^9$ and the intermediate mechanism between the same and the said lever $h^9$. It will also be observed that by adjusting the bell-crank lever $h^7$ to the lever $g^{14}$ the working position of the lateral vibration of the needle-bar will be changed under the action of the ratchet-wheel $g^9$, slide $g^{11}$, and the lever $g^{14}$. It is seen by referring to the drawings that all of these movements are under adjustment and that by changing the adjustments a large variety of different lateral movements can be given to the needle-bar and through it a large number of different stitches produced.

I will now describe the means which are preferably provided for bodily moving the work-carrier and its primary operating mechanism laterally. The mechanism I have previously described for rotating the work-carrier and moving it laterally produces a uniform relative movement between the carrier and the needle—that is to say, during one rotation of the ratchet-wheel C and the cam carried by it the work-carrier is given a rotary movement of a predetermined extent and a reciprocating movement of a predetermined extent, and these movements are repeated each time the ratchet-wheel C rotates.

The following mechanism moves the work-carrier and the mechanism previously described for operating it laterally without interfering with the action of the said mechanism on the work-carrier; but of course as the working position of the work-carrier is changed the movement of the said work-carrier relative to the needle from the action of the said mechanism is automatically changed or varied.

To a hub on the forward end of a shaft L is attached a disk $l'$, the periphery of which is mounted in the bearing $l^2$. The rear end of the shaft L is mounted in a standard $l^3$, which is attached to the bed A of the machine. On the shaft L, next to the disk $l'$, is mounted one end of a pawl-lever $l^4$. Next to the pawl-lever $l^4$ is a ratchet-wheel $l^5$, which is mounted to turn on the shaft L. On the ratchet-wheel $l^5$ is formed a hub $l^6$, on the end of which is fastened a gear-wheel $l^7$. On the side of the ratchet-wheel is attached a flange $l^8$, encircled by a friction-strap $l^9$. In the upper end of the standard $l^3$ is rigidly secured a stud $l^{10}$, on the outer end of which is mounted to turn a gear-wheel $l^{11}$, which meshes with gear-wheel $l^7$. On a hub $l^{12}$, formed on the gear-wheel $l^{11}$, is rigidly mounted a gear-wheel $l^{13}$, which meshes with a gear-wheel $l^{14}$, which is mounted on the shaft L and rigidly held to the same by means of set-screws. A crank-pin $l^{15}$ is adjustably connected by means of a shoe in a keyway $l^{16}$, which is formed in the face of the disk $l'$. On the outer end of the crank-pin $l^{15}$ is mounted a shoe $l^{17}$. On the upper end of the pawl-lever $l^4$ are mounted pawls $l^{18}$ and $l^{19}$. A pin $l^{20}$ projects upwardly from the pawl $l^{18}$. A catch-spring $l^{22}$ is adapted to hold the pawl $l^{18}$ out of engagement with the ratchet-wheel $l^5$. The upwardly-extending pin $l^{20}$ enables the operator to readily adjust the pawl $l^{18}$ out of engagement with the ratchet-wheel $l^5$, as is seen in Fig. 5. A catch-spring $l^{22*}$ is adapted to hold the pawl $l^{19}$ out of engagement with the ratchet-wheel when the pawl is lifted high enough to be caught by the said catch-spring. Springs $l^{23}$ serve to normally hold the pawls $l^{18}$ and $l^{19}$ into engagement with the ratchet-wheel $l^5$. A stop-pawl $l^{24}$ serves to prevent any undesirable rearward movements of the ratchet-wheel $l^5$. A spring $l^{25}$, one end of which is attached to a fixed pin and the other end to the friction-strap $l^9$ and drawing on the same in the opposite direction to the rotation of the ratchet-wheel $l^5$, serves to prevent any undesirable forward movement of the same.

It will be observed that the object of the train of back-gearing is to give a wide range of action of the ratchet-wheel $l^5$ on the shaft L, and using two actuating-pawls is also for the same object. If the lever $l^4$ is moved at its outer end so as to move the actuating-pawls the distance of one-half of a tooth of the ratchet-wheel $l^5$ and both of the pawls are in engagement with the same, it is seen that it will take two strokes of the lever to move the ratchet-wheel ahead one tooth. Of course the same object could be accomplished by having more teeth on the wheel; but this would make it necessary to have an undesirably-large wheel or undersirably-small teeth on the same. A link $l^{26}$, at one end connected with the pawl-lever $l^4$ and at its other end adjustably connected to the lever $d^{11}$, serves as a means for transmitting the vibrations of the lever $d^{11}$ to the pawl-lever $l^4$. A cross-head $l^{27}$ is in engagement with the shoe $l^{17}$. An extension $l^{28}$ at the rear end of the cross-head and a toothed rack $l^{29}$, which is attached to a forward extension $l^{30}$ of the same, are adapted to reciprocate in guideways $l^{31}$ and $l^{32}$. A gear $f^6$ meshes with the toothed portion of the rack $l^{29}$. Screws $f^7$, passing through slots $f^8$ in the gear $f^6$ and having seats in the segmental toothed lever F, serve as means for adjustably fastening the gear $f^6$ to the segmental tooth-rack F.

It is seen from the foregoing that the work-carrier is reciprocated from the movement of the ratchet-wheel C and the cam or eccentric which is carried by it. This cam operates between jaws, as before stated, which are attached to or formed on the rack $c^4$. When the ratchet-wheel C is rotated, the frame B is reciprocated with respect to the rack $c^4$ the extent of the action of the cam which is carried by the said ratchet-wheel, so that the movement of the frame B with respect to the rack $c^4$ remains of a uniform extent. This extent, as before pointed out, is determined by the adjustment of the cam on the ratchet-wheel. If the rack $c^4$ is held in a stationary position, then the movement of the work-carrier through the action of the said ratchet-wheel and cam will be uniform with respect to needle; but if the said rack $c^4$ is moved or shifted during the movement of the said ratchet-wheel and cam it is obvious that the movement of the work-carrier relative to the needle will be varied. The rack $c^4$ is moved, as has been described, from the action of the ratchet-wheel C and the mechanism intermediate the same and the said rack, and as the position of the rack determines the working position of the work-carrier the latter is of course automatically changed when the position of the rack is changed.

As the frame B is moved from the movement of the ratchet-wheel C and the intermediate mechanism between the same and the said frame and as a plurality of stitches and a plurality of movements are made during the movement of the frame in one direction, or, as in the present example of my invention, during one half of a rotation of the ratchet-wheel C and is then moved in an opposite direction during the other half of the rotation of the said ratchet-wheel, it is seen that this is a progressive or step-by-step movement.

The backward and forward movements of the frame B from the ratchet-wheel C are of a uniform extent as between the said frame and the rack $c^4$; but as the latter is bodily moved through the action of the ratchet-wheel $l^5$ and the mechanism between the same and the said rack it is seen that the movement of the frame B from the movement of the ratchet C and through it of the work-carrier with respect to the needle is automatically varied. This is assuming, of course, that the movements of the rack $c^4$ from the ratchet $l^5$ differ as to speed or direction or extent from the movement produced on the work-carrier by the ratchet-wheel C and the cam carried by it.

In practice, as in the present case, the ratchet $l^5$ moves the rack $c^4$ through a train of gears and a rack between the same and the said rack, and a different or slower movement is usually given to the rack $c^4$ than that which is given the frame B by the movement of the ratchet C.

The work-carrier rack $b$ gets a progressive rotating movement from the movement of the ratchet-wheel C and the gearing between the same and the rack, and the said rack gets a progressive movement in one direction and then in an opposite direction from the movement of the frame B through the said ratchet-wheel C and the cam $c^3$, and this second progressive movement of the work-carrier rack $b$ is automatically varied from the movement of the ratchet-wheel $l^5$ and the mechanism between the rack and the said work-carrier rack $b$.

Referring to the figures showing some outlines stitched on the machine, Fig. 11 shows an outline stitched through the action of the ratchet-wheel $l^5$ and its intermediate connections with the work-carrier, the cam $c^3$ having been moved to a central position, so that the work-carrier receives no action from the same. Under these circumstances the work-carrier is simply rotated through the action of the ratchet-wheel C and the intermediate gearing between it and the work-carrier. To stitch the square outline shown in the before-mentioned Fig. 11, the stroke of the actuating-pawl for actuating the ratchet $l^5$ is made of such an extent that the disk $l'$ is rotated four times while the work-carrier rotates once. The adjustment of the crank-pin $l^{15}$ toward the center or from the center of the disk $l'$ and the distance from the center of the work-carrier of the needle determines the convexity or concavity of the sides of the square outline stitched. Of course by adjusting the crank-pin $l^{15}$ the proper extent from the center of the disk $l'$ the sides of the outline stitched will be straight. Outline shown in Fig. 12 is produced by reciprocating the work-carrier eight times (while it is rotated once) through the action of the ratchet-wheel C and mechanism intermediate the same and the work-carrier. The outlines shown in Figs. 14 and 15 are modifications of the action produced by changing the working position of the reciprocating work-carrier through the action of the ratchet-wheel $l^5$ and its mechanism. Of course to produce these figures the angular position of the crank-pin $l^{15}$, relative to the angular position of the cam $c^3$ has to be properly adjusted. The difference in the outline of these two Figs. 14 and 15 is produced by changing the angular position of the cam $c^3$ and the crank-pin $l^{15}$ relative to each other, the extent of the stroke of the actuating-pawls being the same. The oval shown in Fig. 13 is produced by reciprocating the work-carrier once to one rotation of the same. The small action shown on the edge of the outlines is produced by the action of the needle-bar. The needle-bar is vibrated by one cam. The amount of this vibration is automatically increased and decreased and the working position of this action is changed laterally. The work-carrier is rotated through the action of a ratchet-wheel, is reciprocated by the action of a cam, and the working position of this action is changed laterally by the action of a crank-pin adjustably attached to a rotating disk. All of these actions can be used individually or collectively, and they are all individually adjustable with respect to each other.

It is of course seen that an endless variety of designs can be automatically stitched on this machine, that by changing the angular positions of the ratchet-wheel C, $l^5$, and $g^9$ relative to each other, and through them the cams they actuate, varies the design stitched; also, that the number of times these ratchet-wheels turn relative to each other and also the number of times they turn relative to the number of stitches made by the stitching mechanism varies the pattern.

I do not wish to be confined to the particular form and arrangement of parts herein disclosed, it being understood, of course, that various changes might be made in the same which would produce the same or similar results.

The size of material that can be operated upon is limited by the size of the work-carrier and the machine. When it is desired to use the machine for quilting or embroidering on large pieces of work, the carrier for holding the work and the machine and the mechanism operating the carrier can be enlarged sufficiently for said purpose.

In the preferred form of the invention herein disclosed I have shown a stitch-forming mechanism comprising a single needle. It is obvious, however, that a stitch-forming mechanism comprising a plurality of needles might be used.

What I claim as new is—

1. The combination in a sewing-machine having a stitch-forming mechanism, of a work-carrier, means adapted automatically to reciprocate and rotate the said work-carrier, and means adapted automatically to change laterally the reciprocating and rotating position of the said work-carrier.

2. The combination in a sewing-machine having a stitch-forming mechanism, of a work-carrier, means adapted to rotate and reciprocate the said work-carrier, and adjustable means adapted automatically to change the reciprocating and rotating position of the said work-carrier.

3. The combination in a sewing-machine having a stitch-forming mechanism, of a work-carrier, adjustable means adapted automatically to rotate the said work-carrier, adjustable means adapted automatically to reciprocate the said work-carrier, and adjustable means adapted automatically to change laterally the reciprocating and rotating position of the said work-carrier.

4. The combination in a sewing-machine having a stitch-forming mechanism, of a work-carrier, means adapted to rotate and reciprocate the said work-carrier, means adapted automatically to change the reciprocating and rotating position of the said work-carrier a predetermined number of times with respect to a rotation or a portion of a rotation of the said work-carrier.

5. In a sewing-machine, the combination of a needle and its operating parts, a work-carrier, means adapted to rotate the work-carrier so as to move the work across the path of the needle, means adapted to reciprocate the work-carrier across the path of the needle, and means adapted to automatically vary the reciprocating movement of the said work-carrier relative to the needle.

6. The combination in a sewing-machine having a stitch-forming mechanism, of a work-carrier, means adapted to rotate the said work-carrier, means adapted to reciprocate the said work-carrier embodying a cam, a disk, a crank-pin attached to said disk, means intermediate the crank-pin and the cam whereby when the disk is rotated the position of the said cam is changed with respect to the stitch-forming mechanism, and means for rotating the disk.

7. The combination in a sewing-machine having a stitch-forming mechanism, of a frame adapted to reciprocate between stationary bearings, means adapted to feed the work mounted on the said frame, means adapted to reciprocate the said frame embodying an actuating ratchet-wheel also mounted on the said frame, and means adapted to automatically change the reciprocating position of the frame in the direction in which the same reciprocates.

8. The combination in a sewing-machine having a stitch-forming mechanism, of a frame mounted to reciprocate, means for feeding the work mounted on said frame, a ratchet-wheel mounted on said frame, means whereby when said ratchet-wheel is actuated said frame is reciprocated, an oscillating shaft, a traveler on said shaft, and means for moving the same longitudinal of the shaft, a connection between the said traveler and aforesaid ratchet-wheel whereby the said ratchet-wheel is actuated.

9. The combination in a sewing-machine having stitch-forming mechanism, of a work-carrier, means for reciprocating the work-carrier comprising a ratchet-wheel which is mounted and adapted to reciprocate with the work-carrier, a vibrating piece adapted to be reciprocated, means intermediate the piece and the ratchet-wheel whereby the ratchet-wheel is operated from the movement of the piece, and means between the work-carrier and the piece whereby the piece is reciprocated from the movement of the work-carrier.

10. The combination with a sewing-machine having a vertically-reciprocating and laterally-vibrating needle-bar and complemental stitch-forming mechanism, of means adapted automatically to increase and decrease the extent of the vibrations of the said needle-bar, means adapted automatically to move laterally the vibrating position of the said needle-bar, a work-carrier, means adapted to rotate the said work-carrier, means adapted to reciprocate the said work-carrier, and means adapted automatically to move laterally the reciprocating position of the said work-carrier.

11. The combination with a sewing-machine having a vertically-reciprocating and laterally-vibrating needle-bar and complemental stitch-forming mechanism, of means adapted automatically to increase and decrease the extent of the lateral vibrations of the said needle-bar, means adapted automatically to move laterally the vibrating position of the said needle-bar, a work-carrier, means adapted to rotate the said work-carrier, means adapted automatically to reciprocate the said work-carrier, means adapted automatically to increase and decrease the extent of the reciprocations of the said work-carrier, and means adapted automatically to move laterally the reciprocating and rotating position of the said work-carrier.

12. The combination with a sewing-machine having a vertically-reciprocating and laterally-vibrating needle-bar and complemental stitch-forming mechanism, of means adapted automatically to move laterally the vibrating position of the said needle-bar, a work-carrier, means adapted to rotate the said work-carrier, means adapted to reciprocate the said work-carrier, and means adapted to move laterally the rotating and reciprocating position of the said work-carrier a predetermined number of times with respect to a predetermined number of lateral movements of the vibrating position of the needle-bar.

13. The combination with a sewing-machine having a vertically-reciprocating and laterally-vibrating needle-bar and complemental stitch-forming mechanism, of a cam, means whereby when said cam is actuated the working position of the vibrating needle is moved laterally, means for actuating said cam, a second cam, and means for operating the same, a work-carrier reciprocated by said second cam, a crank-pin, means for operating said crank-pin, and means operated through the movements of the said crank-pin adapted to move laterally the reciprocating position of the said work-carrier.

14. In combination in a sewing-machine, stitch-forming mechanism, feeding mechanism comprising a reciprocating work-carrier, means for changing the reciprocating position of the said work-carrier comprising the rack $c^4$, the tooth-lever F, the gear $f^6$ and the connection between the same and the tooth-lever F, the rack $l^{29}$ adapted to engage the gear $f^6$ and means for reciprocating the rack $l^{29}$.

15. The combination with a sewing-machine having stitch-forming mechanism, of feed mechanism comprising a rotating work-carrier adapted to be reciprocated, means for reciprocating the said work-carrier, a ratchet-wheel and means for operating the same, and means comprising a train of gearing intermediate the ratchet-wheel and the work-carrier whereby the reciprocating position of the work-carrier is automatically changed.

16. In a sewing-machine, a needle and means for reciprocating it, a work-carrier, means for operating the work-carrier so as to move the work in a plane substantially at right angles to the plane in which the needle reciprocates, means for producing a relative vibrating or jogging movement between the needle and the work-carrier, means for producing a relative progressive step-by-step movement between the needle and the work-carrier, and means for simultaneously varying the amplitude of the said relative jogging movement and the amplitude of the steps of the said relative progressive movement.

17. In a sewing-machine, a vertically-reciprocating and laterally-vibrating needle bar or holder, a needle carried by the said needle-bar, a work-carrier, means for operating the said work-carrier so as to move the work substantially at right angles to the lateral movements of the needle, means for reciprocating the work-carrier substantially in the same direction in which the needle moves laterally, and means for automatically varying the amplitude of the said reciprocation of the work-carrier.

18. In a sewing-machine, a needle and means for operating it, a work-carrier, means for producing a relative rotary movement between the needle and the work-carrier, an oscillating shaft, a device operated from the movement of the said shaft for producing a relative reciprocating movement between the needle and the work-carrier, and means for automatically moving the said device laterally and thereby varying the amplitude of the reciprocating movement between the needle and the work-carrier.

19. In a sewing-machine, a needle and means for operating it, a work-carrier mounted and adapted to be reciprocated and rotated in a horizontal plane, a shaft extending in a horizontal plane and adapted to oscillate in a vertical plane, a traveler mounted and adapted to move in a horizontal plane and in the same direction in which the work-carrier is adapted to reciprocate, means intermediate the traveler and the work-carrier whereby when the aforesaid shaft is oscillated the work-carrier and traveler are reciprocated, and means for oscillating the aforesaid shaft.

In testimony whereof I have hereunto set my hand in the presence of two subscribing witnesses.

WILLIAM N. PARKES.

Witnesses:
S. J. COX,
HERMAN MEYER.